Patented Feb. 1, 1949

2,460,573

UNITED STATES PATENT OFFICE 2,460,573

INTERPOLYMERS OF VINYLIDENE HALIDES, DIALKYL ESTERS OF MALEIC ACID, AND VINYL ESTERS AND METHOD OF MAKING SAME

Vernon L. Folt, Akron, Ohio, assignor to The B. F. Goodrich Company, New York, N. Y., a corporation of New York No Drawing. Application April 10, 1946, Serial No. 661,079

10 Claims. (Cl. 260—78.5)

1

This invention relates to new polymers of vinylidene halides and pertains more specifically to interpolymers of vinylidene halides with at least two other types of polymerizable materials: diesters of maleic acid having the structure

ROOC—CH=CH—COOR' in which R and R' are saturated aliphatic hydrocarbon groups, and vinyl esters of organic or inorganic acids.

These new interpolymers possess certain unusual properties which make them eminently suitable for the manufacture of films and fibers, as well as for the manufacture of molded or extruded objects. These properties include, among others, excellent stability to heat or light without the necessity for addition of separate stabilizing agents; excellent resistance to most solvents at ordinary temperatures; excellent tensile strength; and a melting point only slightly below that of the pure polyvinylidene halide.

Among the vinylidene halides which may be used are vinylidene chloride, vinylidene fluoride, vinylidene bromide, vinylidene chloro-fluoride, and the like, vinylidene chloride being preferred. Although any diester of maleic acid having the structure ROOC—CH=CH—COOR' in which R and R' are saturated aliphatic hydrocarbon groups may be used, such as dimethyl maleate, diethyl maleate, di-n-propyl maleate, di-isopropyl maleate, ni-n-butyl maleate, di-isobutyl maleate, or the like, it is preferred to employ the dialkyl maleates, especially those containing no more than six carbon atoms in each of the alkyl groups. Among the vinyl esters which may be used are vinyl bromide, vinyl chloride, vinyl fluoride, vinyl cyanide, vinyl acetate, vinyl chloroacetate, vinyl propionate, vinyl butyrate, vinyl benzoate, and the like. The vinyl halides are preferred, especially vinyl chloride. The interpolymers which combine all of the desired properties in the most satisfactory manner comprise at least 30% of vinylidene halide, at least 1% of maleic ester, and at least 1% of vinyl ester by weight. The preferred class of polymers comprises those consisting of from about 30 to about 95% by weight of vinylidene halide, from about 1 to about 45% of maleic ester, and from about 1 to about 25% of vinyl ester, especially those consisting of from about 70 to about 95% by weight of vinylidene halide, from about 1 to about 20% of maleic ester, and from about 1 to about 15% of vinyl ester.

2

These new interpolymers may be prepared by any of the usual methods employed for making vinyl polymers, for example, by carrying out the polymerization of a mixture of the monomers in the desired proportions in aqueous dispersion, or in solution in a suitable solvent, or in the absence of any solvent or diluent. Best results have been obtained by carrying out the reaction in aqueous dispersion, from which the polymer may be obtained either in the form of latex or as fine granules, depending upon the type and amount of dispersing agent used. The polymerization reaction may be carried out at any desired temperature from about room temperature up to 100° C. or even higher; best results are obtained by employing temperatures from about 35° to about 60° C.

Any of the catalysts commonly used for the polymerization of vinyl compounds may be employed in the preparation of my new interpolymers. Actinic radiation may be used, as well as various peroxygen compounds, such as hydrogen peroxide, potassium persulfate, sodium perborate, benzoyl peroxide, caprylyl peroxide, and the like. In order to control the hydrogen ion concentration of the reaction mixture, ammonia, amino-alcohols such as 2-amino-2-methyl-1-propanol, or buffer salts such as sodium bicarbonate, sodium acid phosphate, lead acetate, or the like, may be added to the polymerization mixture.

When the polymerization is carried out in aqueous emulsion a wide variety of dispersing or emulsifying agents may be used. Suitable materials are, for example, gelatin; soaps such as sodium oleate, potassium palmitate, sodium myristate, and rosin or dehydrogenated rosin soaps; synthetic saponaceous materials such as salts of alkaryl sulfonic acids or of acid sulfuric esters of long chain alcohols, e. g. sodium isopropyl naphthalene sulfonate, sodium lauryl sulfate; and the like.

In order to obtain highly uniform products, it may be desirable to introduce one or more of the monomeric materials into the reaction mixture gradually during the course of the polymerization. This expedient also facilitates control of the rate of the reaction. Although the polymerization may be carried out in the presence of air, the reaction is ordinarily faster in the absence of air.

These new interpolymers possess unique properties not found in other similar polymers and copolymers. They may readily be melted or fused without decomposition to form low viscosity melts, which may readily be extruded in the form of fine filaments. On the other hand, polyvinylidene halides, such as polyvinylidene chloride, decompose at temperatures only slightly above their melting points, and in addition, the molten polymers possess a high viscosity so that formation of fine filaments from the melt without the use of solvents is extremely difficult. My new polymers are predominantly crystalline in structure, and melt sharply at temperatures generally above 150° C. These properties render the new polymers suitable for the formation of strong, heat-stable films and monostrands without the use of expensive solvents.

It has also been noted that filaments or monostrands of my new interpolymers may be drawn or racked much more readily than those made from polyvinylidene halides alone, such as polyvinylidene chloride. The force required to orient the polymer molecules is much less in the case of my new interpolymers than in the case of the homopolymers, and the number of breaks in the filaments during the racking process is greatly reduced. The interpolymers of vinylidene chloride and vinyl chloride containing a maleic ester as a third component have been found, surprisingly enough, to have higher melting points than polymers containing only vinylidene chloride and vinyl chloride, in spite of the fact that vinyl chloride by itself forms a high molecular weight polymer which is almost infusible. Copolymers containing only vinyl chloride and dialkyl maleate differ from my new interpolymers in being primarily amorphous rather than crystalline in structure. Moreover, they do not melt sharply at a definite temperature, but instead soften gradually over a wide temperature range so that it is extremely difficult or impossible to prepare fine filaments by extrusion of the molten polymer.

The following specific examples are given in order more fully to illustrate the nature of my invention:

Examples 1 to 13

There was prepared polymerization mixtures having the following composition, in which the parts are by weight:

Monomer mixture _____ 100
Water _____ 250
Sodium bicarbonate _____ 0.6
Dispersing agent [1]_____ 0.6
o,o'-Dichlorobenzoyl peroxide _____ 0.3

[1] Mixture of gelatin and sodium salt of diisobutyl naphthalene sulfonate.

The monomer mixture consisted in each case of vinylidene chloride, diethyl maleate, and vinyl chloride in the following proportions

|  | 1 | 2 | 3 | 4 | 5 | 6 | 7 | 8 | 9 | 10 | 11 | 12 | 13 |
|---|---|---|---|---|---|---|---|---|---|---|---|---|---|
| Vinylidene chloride | 90 | 90 | 85 | 85 | 85 | 80 | 80 | 80 | 80 | 70 | 70 | 70 | 70 |
| Diethyl maleate | 5 | 2.5 | 10 | 5 | 7.5 | 5 | 10 | 15 | 7.5 | 10 | 15 | 20 | 5 |
| Vinyl chloride | 5 | 7.5 | 5 | 10 | 7.5 | 15 | 10 | 5 | 12.5 | 20 | 15 | 10 | 25 |

The mixtures were placed in glass containers, which were then sealed and heated at 50° C. with constant agitation. Good yields of fine white polymer powders were obtained in each case. The melting points of these polymers were observed by placing a small sample of the polymer powder on a metal plate and heating until the polymer particles fused to a semi-fluid mass. The melting temperatures are given in the following table:

| Example | Melting Temp., °C. |
|---|---|
| 1 | 175 |
| 2 | 177 |
| 3 | 185 |
| 4 | 155 |
| 5 | 170 |
| 6 | 167 |
| 7 | 172 |
| 8 | 175 |
| 9 | 168 |
| 10 | 148 |
| 11 | 145 |
| 12 | 155 |
| 13 | 143 |

For comparison, the melting points of interpolymers consisting solely of vinylidene chloride and vinyl chloride prepared by polymerization in aqueous dispersion are listed below:

| Vinylidene chloride | Vinyl chloride | Melting temp., °C. |
|---|---|---|
| 100 | 0 | 200 |
| 95 | 5 | 185 |
| 90 | 10 | 170 |
| 80 | 20 | 150 |

It is clear from these data that the replacement of a portion of the vinyl chloride with maleic ester tends to raise the melting temperature of the resulting polymer. In addition, it increases very greatly the heat stability of the polymer.

Example 14

The following reaction mixture was prepared, in which the parts are by weight:

Vinylidene chloride _____ 340
Dimethyl maleate _____ 30
Vinyl chloride _____ 30
Water _____ 1000
Sodium bicarbonate _____ 3
Dispersing agent [1] _____ 3
o,o'-Dichlorobenzoyl peroxide _____ 1.2

[1] Same as in preceding examples.

The mixture was placed in a stainless steel autoclave equipped with a stirrer; the residual air was removed at reduced pressure, and the mixture was heated for 40 hours at 50° C. with constant agitation. A fine, white polymer powder was obtained, the yield being about 94% of the theoretical amount.

Example 15

The following reaction mixture was prepared, in which the parts are by weight:

Vinylidene chloride _____ 340
Di-n-butyl maleate _____ 30
Vinyl chloride _____ 30
Water _____ 1000
Sodium bicarbonate _____ 3
Dispersing agent [1] _____ 3
o,o'-Dichlorobenzoyl peroxide _____ 1.2

[1] Same as in preceding examples.

The mixture was placed in a stainless steel autoclave equipped with a stirrer; the residual air was removed at reduced pressure, and the mixture was heated for 40 hours at 50° C. with constant agitation. A fine, white polymer powder was obtained in good yield; the polymer had a melting point of about 172° C.

In addition to the monomeric materials described in the specific examples, other vinylidene halides, maleic esters, and vinyl esters as defined in the appended claims may be employed to give polymers having similar properties. The relative proportions of vinylidene halides may vary from as little as 30% to as much as 98%, while the proportions of maleate and of vinyl ester may vary from 1 to 45% and from 1 to 25% respectively, with similar results.

While the interpolymers of this invention show far better heat and light stability than polymers of vinylidene halides alone or than copolymers of vinylidene halides with vinyl esters, this stability may be still further increased, if desired, by the incorporation of stabilizing agents, such as epichlorohydrin, ethyl glycidate, the partial ester of cottonseed oil fatty acid with glycerine, glycine, alanine, triethanolamine, eugenol, esters of salicylic acid, diphenyl indene, or the like, in the polymer composition.

These new polymers, as has been pointed out above, possess properties which enable them to be formed into filaments, molded shapes, etc., without the use of any solvent or plasticizers. If, however, it is desired to modify their properties by the use of a plasticizer, chlorinated aromatic hydrocarbons such as chlorobenzene, alpha-chloronaphthalene, benzyl chloronaphthalene, chlorobenzyl chloronaphthalene, or the like, or chlorinated aromatic ethers such as p-chlorophenyl ether may be used. Moreover, any of the usual fillers, pigments, reinforcing agents, dyes, and natural or synthetic resins may be mixed with the polymers in order to obtain any desired effect.

The high heat stability of these new interpolymers was shown by heating samples of the polymers for two minutes at 215° C. Under these conditions, polyvinylidene chloride and a copolymer of 90 parts of vinylidene chloride with 10 parts of vinyl chloride showed a definite brown discoloration, whereas an interpolymer of 85 parts of vinylidene chloride with 7½ parts of diethyl maleate and 7½ parts of vinyl chloride showed only a barely perceptible yellowing under the same conditions. Similar results may be obtained with other triple polymers such as those described in the specific examples above, as little as 1% of maleate producing a substantial increase in the heat stability of the polymer.

Filaments may be prepared from these new polymers, for example, by mixing the polymer with the desired plasticizer, stabilizer, etc., in a ball mill, then melting the mixture and extruding it at low pressure through a small orifice. The molten polymer need be heated to a temperature only 5 or 10° C. above the melting point. The extruded filament may be drawn or racked as soon as it has cooled sufficiently to solidify. Upon standing over night, or upon heating for a short time at 100 to 150° C., crystallization of the drawn filaments occurs to give a product having a tensile strength of about 40,000 to 60,000 lb. per sq. in.

The above descriptions and examples are intended to be illustrative only. Included in my invention are all of the obvious variations and modifications falling within the spirit and scope of the appended claims.

I claim:

1. An interpolymer prepared by polymerizing in aqueous dispersion a mixture of monomeric materials consisting of from 30 to 95% of a vinylidene halide, from 1 to 45% of a dialkyl ester of maleic acid having not more than six carbon atoms in each of said alkyl groups, and from 1 to 25% of a vinyl halide.

2. An interpolymer prepared by polymerizing in aqueous dispersion a mixture of monomeric materials consisting of from 30 to 95% of vinylidene chloride, from 1 to 45% of a dialkyl ester of maleic acid having not more than six carbon atoms in each of said alkyl groups, and from 1 to 25% of a vinyl halide.

3. An interpolymer prepared by polymerizing in aqueous dispersion a mixture of monomeric materials consisting of from 70 to 95% of vinylidene chloride, from 1 to 20% of a dialkyl maleate containing no more than six carbon atoms in each of said alkyl groups, and from 1 to 15% of a vinyl halide.

4. An interpolymer prepared by polymerizing in aqueous dispersion a mixture of monomeric materials consisting of from 70 to 95% of vinylidene chloride, from 1 to 20% of a dialkyl maleate containing no more than six carbon atoms in each of said alkyl groups, and from 1 to 15% of vinyl chloride.

5. An interpolymer prepared by polymerizing in aqueous dispersion a mixture of monomeric materials consisting of from 70 to 95% of vinylidene chloride, from 1 to 20% of diethyl maleate, and from 1 to 15% of vinyl chloride.

6. The method which comprises polymerizing in aqueous dispersion a mixture of monomeric materials consisting of from 30 to 95% of a vinylidene halide, from 1 to 45% of a dialkyl ester of maleic acid containing not more than six carbon atoms in each of said alkyl groups, and from 1 to 25% of a vinyl halide.

7. The method which comprises polymerizing in aqueous dispersion a mixture of monomeric materials consisting of from 70 to 95% of vinylidene chloride, from 1 to 20% of a dialkyl maleate containing no more than six carbon atoms in each of said alkyl groups, and from 1 to 15% of a vinyl halide.

8. The method which comprises polymerizing in aqueous dispersion a mixture of monomeric materials consisting of from 70 to 95% of vinylidene chloride, from 1 to 20% of diethyl maleate, and from 1 to 15% of vinyl chloride.

9. An interpolymer prepared by polymerizing in aqueous dispersion a mixture of monomeric materials consisting of from 30 to 95% of a vinylidene halide, from 1 to 45% of a dialkyl ester of maleic acid containing not more than six carbon atoms in each of said alkyl groups, and from 1 to 25% of a vinyl ester.

10. The method which comprises polymerizing in aqueous dispersion a mixture of monomeric materials consisting of from 30 to 95% of a vinylidene halide, from 1 to 45% of a dialkyl ester of maleic acid containing not more than six carbon atoms in each of said alkyl groups, and from 1 to 25% of a vinyl ester.

VERNON L. FOLT.

REFERENCES CITED

The following references are of record in the file of this patent:

UNITED STATES PATENTS

| Number | Name | Date |
|---|---|---|
| 2,233,442 | Wiley | Mar. 4, 1941 |
| 2,329,456 | Campbell | Sept. 14, 1943 |
| 2,344,511 | Harder | Mar. 21, 1944 |
| 2,404,511 | Strain | July 30, 1946 |

FOREIGN PATENTS

| Number | Country | Date |
|---|---|---|
| 477,532 | Great Britain | Jan. 3, 1938 |